United States Patent
Combs

(10) Patent No.: US 10,309,682 B2
(45) Date of Patent: Jun. 4, 2019

(54) PROCESS FOR FORMING AN INSULATED REGISTER BOX

(71) Applicant: STERLING CUSTOM SHEET METAL, INC., Magnolia, TX (US)

(72) Inventor: Sterling Kidd Combs, Magnolia, TX (US)

(73) Assignee: STERLING CUSTOM SHEET METAL, INC., Magnolia, TX (US)

( * ) Notice: Subject to any disclaimer, the term of this patent is extended or adjusted under 35 U.S.C. 154(b) by 319 days.

(21) Appl. No.: 15/439,454

(22) Filed: Feb. 22, 2017

(65) Prior Publication Data

US 2017/0191696 A1    Jul. 6, 2017

Related U.S. Application Data

(63) Continuation-in-part of application No. 14/668,079, filed on Mar. 25, 2015, now Pat. No. 9,951,969.

(51) Int. Cl.

| | |
|---|---|
| *F24F 7/00* | (2006.01) |
| *F24F 13/02* | (2006.01) |
| *F24F 13/08* | (2006.01) |
| *B29C 41/20* | (2006.01) |
| *F24F 13/06* | (2006.01) |
| *B29K 75/00* | (2006.01) |
| *B29K 105/04* | (2006.01) |
| *B29K 105/00* | (2006.01) |
| *B29C 44/02* | (2006.01) |

(52) U.S. Cl.
CPC .......... *F24F 13/0263* (2013.01); *B29C 41/20* (2013.01); *F24F 13/06* (2013.01); *F24F 13/082* (2013.01); *B29C 44/025* (2013.01); *B29K 2075/00* (2013.01); *B29K 2105/0058* (2013.01); *B29K 2105/04* (2013.01); *B29K 2995/0015* (2013.01)

(58) Field of Classification Search
CPC .... F24F 13/0263; F24F 13/06; F24F 113/082; B29C 44/025
USPC ................ 454/330; 249/121, 122, 124, 128; 52/742.1
See application file for complete search history.

(56) References Cited

U.S. PATENT DOCUMENTS 2,356,827 A * 8/1944 Coss ...................... F25D 23/064
                                                  52/742.11
3,559,560 A * 2/1971 Trahan .................... F24F 13/06
                                                    248/343

* cited by examiner

Primary Examiner — Helena Kosanovic
(74) Attorney, Agent, or Firm — Egbert Law Offices, PLLC

(57) ABSTRACT

A process for insulating a register box in which the register box has a plurality of side panels arranged in a generally rectangular configuration and a duct opening through a wall that extends across the generally rectangular configuration, in which the process includes flowing an expandable polymeric material toward the plurality of side panels, placing the register box into or onto a support structure, introducing a liner over the flowed expandable polymeric material within the register box, and placing a form onto the liner in the register box so as to shape the expandable polymeric material within the register box. The form and the liner are then removed from the register box.

19 Claims, 6 Drawing Sheets

PROCESS FOR FORMING AN INSULATED REGISTER BOX

CROSS-REFERENCE TO RELATED APPLICATIONS

The present application is a continuation-in-part of U.S. patent application Ser. No. 14/668,079, filed on Mar. 25, 2015, and entitled "Insulated Register Box And Method For Forming An Insulated Register Box", presently pending.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to ductwork for heating, ventilation and air-conditioning (HVAC) systems. More particularly, the present invention relates to register boxes as used in such systems. More particularly, the present invention relates to processes for forming such register boxes.

2. Description of Related Art Including Information Disclosed Under 37 CFR 1.97 and 37 CFR 1.98

To create the desired ambient conditions within a structure, a typical HVAC system is installed for circulating and/or conditioning air drawn from the interior of the structure and returned to the interior of the structure. A central unit or several units are located in or near the structure, each unit comprising a fan for air circulation and optionally comprising a heating, humidification, or cooling system for conditioning the air passing through the central unit.

To conduct air to and from each central unit, ducting is provided in the structure. The ducting includes supply-air ducts which provide conditioned air to the interior of the structure and are connected to the outlets of each central unit and return-air ducts which return air to each central unit and are connected to inlets of each central unit. Supply-air ducts typically terminate in supply-air register boxes mounted to the walls, the ceilings, or other surfaces within the interior, whereas return-air ducts typically begin at register boxes mounted to a surface within the interior, such as a wall, ceiling, or floor. There are usually many more register boxes for supplying air than for returning air, with those for returning air typically being substantially larger than those for supplying air.

To increase efficiency, building codes are being revised to require substantially airtight HVAC systems. In the past, a standard technique has been utilized for forming such sheet-metal register boxes. A form is cut from a rectangular, planar metal sheet. The form has cutouts for corners or other features to allow bending of the form into the desired shape. Cutouts define the height of the sides and an overlapping flap is formed by cutting a slot at each cut out. The sides are bent along bend lines to lie in intersecting planes so as to form an open-bottom, rectangular enclosure of a register box, with the vertical edges of the sides abutting the inside surfaces of the sides. The flap is folded around each corner that lies adjacent the outer surface of the side and then fastened to the side with rivets. In order to complete the register box, a circular duct connector or is connected to a circular cutout in the upper surface of the box. Prior art register boxes are also formed with abutting edges to form the enclosure. The abutting or overlapping edges may be fastened by adhering or by other fastening means, such as spot welding.

The method described above produces ducting enclosures that often leak conditioned air through the gaps between the edges at the corners, or, in the case of enclosures formed with multiple pieces, through the seams where the pieces are joined together. The prior-art method includes many labor-intensive steps to form the enclosures, including the cutting of the planar sheet and the fastening of the edges.

In order to achieve the requisite efficiency in compliance with building codes, insulation is used with such register boxes. The formation of the insulation of the register boxes has become somewhat of a problem. Since the boxes are conventionally made of sheet metal, such as galvanized steel or aluminum, the insulation must be applied to either or both the inside and outside of the register box either before or after it is installed. The cutting and fastening of the insulation to the box is tedious and time-consuming. As such, it is thereby rather expensive in terms of the cost of the insulation material and in terms of the amount of time required to properly insulate the register box.

The placement of insulation can be a time-consuming, hazardous, and tedious task. Typically, a large section of fibrous material requires a cutting into various shapes that fit within the interior of the register box. This fibrous material is then affixed to the walls on the inside of the register box by hand. Often, many steps are required so as to properly fit the insulation material within the register box. Furthermore, since fibrous material is being manually handled by workers, there can be exposure to airborne fibers. The cutting and fitting of the insulation material within the register box is extremely tedious and boring to workers.

In the past, various patents have issued relating to register boxes and to the insulating of such register boxes. For example, U.S. Pat. No. 3,985,158, issued on Oct. 12, 1976 to J. V. Felter, describes a box for mounting diffusers wherein the main body of the box is made of expanded plastic or similar material. One or more connection elements are molded within the walls of the box to provide for connection of the box to the building structure and to a duct and also to reinforce the box.

U.S. Pat. No. 4,735,235, issued on Apr. 5, 1988 to Anderson et al., discloses an insulated duct end system. The system includes duct assemblies and transition components for interconnecting the duct assemblies. Each duct assembly includes an insulated duct having a rigid sleeve within at least one end. Each sleeve includes an abutment ring and orifices in the ring for permitting air to flow into the insulated area to balloon the layer and improve its insulative effect.

U.S. Pat. No. 5,095,942, issued on Mar. 17, 1992 to G. C. Murphy, teaches a plastic self-insulating ductwork system. The system includes a distribution box which includes an upper portion having a plurality of walls and a bottom plate. The distribution box is joined to interconnecting duct lines by adapter conduits. The adapter conduits are adapted at one end for connection to an opening in the wall and are adapted at the other end for connection to an adjoining duct line. U.S. Pat. No. 5,219,403, issued on Jun. 15, 1993 the G. C. Murphy, discloses a similar type of self-insulating ductwork system as that of U.S. Pat. No. 5,095,942.

U.S. Pat. No. 5,658,196, issued on Aug. 19, 1997 to T. L. Swaim, provides an air duct diffuser for attachment to a ceiling grid. The diffuser includes a frame which mounts to the ceiling grid and a louver which mounts to the frame for directing diffused air within an associated airspace. A preformed composite housing of insulating material mounts to the frame and has punch-out duct openings of varying sizes.

U.S. Pat. No. 5,749,190, issued on May 12, 1998 to S. R. Williams, shows an HVAC register box having no welded or riveted corners and also a process for making such an HVAC register box. The register box is fabricated from a single sheet of material without cutting. The register box has superior rigidity and resistance to air leakage at the joints or corners.

U.S. Pat. No. 5,957,506, issued on Sep. 28, 1999 to M. D. Stepp, provides a sheet-metal insulated register box. The register box has an adjustable elbow fitting that is coupled directly to an air inlet panel of an air distribution register box by having roll-formed flange portions that are mated in interlocking, overlapping engagement with each other. The air inlet panel includes an outwardly flared coupling flange bordering an air inlet opening. The neck of the sheet-metal elbow includes a folded coupling flange that is dimensioned for interfitting, overlapping engagement with the outwardly-flared elbow coupling flange.

U.S. Patent Publication No. 2008/0014860, published on Jan. 17, 2008 to Heitman et al., discloses a method and apparatus for eliminating register boxes. A collar plate assembly interfaces with metal air ducts and is provided with at least one spring indentation ring to accept two or more locking springs. The locking springs are used to attach the ceiling register to the collar plate assembly. The collar plate assembly uses mounting rails that attach the assembly to either the ceiling or wall supports. A trim ring is inserted in the cutout that attaches between the collar in the ceiling so as to eliminate air leakage and so as to provide an essentially smooth flow of air from the supply duct to the inside of the structure.

U.S. Patent Publication No. 2004/0130154, published on Jul. 8, 2004 to Stepp et al., shows a substantially airtight register box for HVAC systems. The register box has a body formed from at least one planar sheet. The body has an inlet and outlet. At least one of the inlet and the outlet is formed by folding corners of the planar sheet to form planar sides that lie in intersecting planes. The enclosure is then mounted to a surface of an interior area of a structure and is connected to ducts for communicating air between the interior area at a central air-handler unit.

U.S. Patent Publication No. 2008/0045137, published on Feb. 21, 2008 F. Rosal, discloses an insulated plenum box for heating, ventilating and air conditioning duct systems. This plenum box has insulation sprayed onto either the inside or outside of the plenum box in order to match the R-value of the connecting insulated duct.

It is an object of the present invention to provide a process for forming a register box which minimizes air loss.

It is another object of the present invention to provide a process for forming a register box which improves the insulated rating of the register box.

It is another object of the present invention to provide a process for forming a register box in which the register box is fire-resistant.

It is another object of the present invention to provide a process for forming a register box in which the register box is compliant with national building codes.

It is another object of the present invention to provide a process for forming a register box which allows the register box to be stackable.

It is another object of the present invention to provide a process for forming a register box which avoids the use of fibrous insulation.

It is another object of the present invention to provide a process for forming a register box which improves the health and safety to workers assembling the register box.

It is a further object of the present invention to provide a process for forming a register box in which the formed register box is very energy efficient.

It is still another object of the present invention to provide a process for forming a register box which allows inspectors to quickly ascertain that the register box is insulated.

It is still further object of the present invention to provide a process for forming a register box which does not require the alteration of the structure of the existing register box.

It is still a further object of the present invention to provide a process for forming a register box in which the process is very efficient, relatively inexpensive and efficient.

These and other objects and advantages of the present invention will become apparent from a reading of the attached specification and appended claims.

BRIEF SUMMARY OF THE INVENTION

The present invention is a process for insulating a register box. The register box has a plurality of side panels arranged in a generally rectangular configuration and a duct opening through a wall that extends across the generally rectangular configuration. The process includes the steps of: (1) flowing an expandable polymeric material toward the plurality of side panels; (2) placing the register box into or onto a support structure; (3) introducing a liner over the flowed expandable polymeric material within the register box; (4) placing a form on the liner in the register box so as to shape the expandable polymeric material within the register box; and (5) removing the form and the liner from the register box.

In the process of the present invention, a lid is closed over the form and over an end of the register box so as to limit an expansion of the expandable polymeric material. The lid is locked over the end of the register box for a period of time while the expandable polymeric material expands. The lid is unlocked prior to the step of removing the form and the liner.

The support structure is positioned onto an underlying surface prior to the step of placing the register box. The support structure has an interior. The duct of the register box is positioned into the interior of the support structure such that the wall of the register box is positioned onto a top of the support structure. The support structure is locked so as to be in a fixed position on the underlying surface.

The form is a plug having a diameter greater than a diameter of the duct. The plug is placed over the duct so as to be generally axially aligned with the duct such that the plug has edges residing on the wall of the register box. The liner is introduced over the flowed expandable polymeric material such that outer edges of the liner reside outwardly of an end of the register box. The step of removing includes grasping the outer edges of the liner and then lifting the liner and the form from the register box. The register box is lifted from the structural support following the step of removing.

The underlying surface can be a carousel. The carousel is rotated prior to the step of removing.

The flowed polymeric material is solidified against the plurality of sidewalls. The register box has a plurality of flanges extending inwardly respectively from the plurality of side panels at an end thereof opposite the wall of the register box. The plurality of flanges define an aperture. The step of solidifying include solidifying the expandable polymeric material against the plurality of side panels such that the solidified expandable polymeric material has a thickness approximately equal to a width of the flange. At least one side panel of the plurality of side panels has a seam. The expandable polymeric material is solidified such that a portion of the solidified expandable polymeric material emerges through the seam. The wall also as a seam adjacent the opening of the duct. The expandable polymeric material is solidified such that a portion of the solidified expandable polymeric material emerges through the seam. The step of removing is after the step of solidifying.

The step of flowing includes providing a supply of the expandable polymeric material, and injecting the supply of expandable polymeric material as a foam toward the plurality of side panels. The step of injecting includes moving a foam gun around the interior of the register box such that the pumped expandable polymeric material is directed toward the plurality of side panels. In the present invention, the expandable polymeric material is polyurethane.

This foregoing Section is intended to describe, with particularity, the preferred embodiment of the present invention. It is understood that modifications to these preferred embodiments can be made within the scope of the present claims. As such, this Section should not to be construed, in any way, as limiting of the broad scope of the present invention. The present invention should only be limited by the following claims and their legal equivalents.

DETAILED DESCRIPTION OF THE INVENTION

Figure 1:
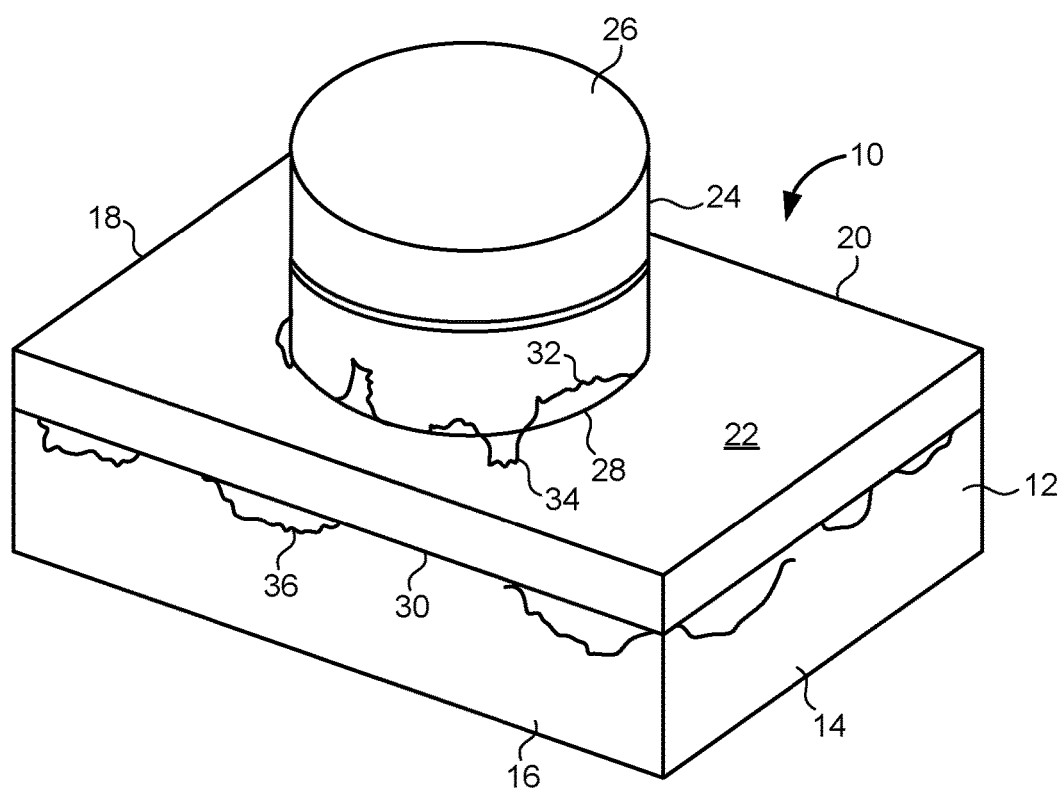
FIG. 1 is a perspective view showing the register box as formed by the process of the present invention.

Referring to FIG. 1, there is shown the insulated register box 10 formed in accordance with process of the present invention. The register box 10 includes a body 12 having side panels 14, 16, 18 and 20 formed into a generally rectangular configuration. A wall 22 extends across this generally rectangular configuration. A duct 24 is illustrated as affixed to the wall 22 so as to open to the interior of the body 12. The duct 24 includes an open end 26 so as to allow duct 24 to be connected to the HVAC system of a building.

Conventionally, the register box 10 will be formed and pieced together through the use of tack welding. Tack welding is a very efficient manner of forming the register box. Unfortunately, tack welding can often leave gaps and seams in certain areas through which air can penetrate. In particular, the duct 24 can be tack welded to the body 22. Similarly, portions of the body 12 can be tack welded together. As illustrated in FIG. 1, there is a seam 28 that occurs between the duct 24 and the wall 22 of body 12 and also a seam 30 that is located on the side panels 14 and 16.

As will be described hereinafter, an expandable polymeric material, such as polyurethane, is applied for the purposes of insulating the interior of the body 12. In FIG. 1, it can be seen that a portion 32 of the expanded polymeric material actually emerges through the seam 28 so as to reside outwardly on the exterior of the duct 24. Another portion 34 of the expanded polymeric material is illustrated as residing on an exterior surface of the wall 22. Similarly, a portion of the expanded polymeric material 36 extends outwardly through the seam 30 and resides on the exterior of the body 12. This is an important feature of the present invention.

Fundamentally, expanded polyurethane material will expand in an irregular manner. As such, as the polyurethane material expands, it will tend to flow through any pores, gaps, seams and openings. As such, the various portions 32, 34 and 36 of the expanded polymeric material will actually penetrate through the seams. This effectively closes the seams and enhances the air-tightness of the register box 10. Additionally, since this expanded polymeric material can actually be seen on the exterior of the register box, it can be easily viewed by inspectors to see if a register box is insulated or not. To enhance this quality, the expanded polymeric material should be of a different color than the color of the register box. As such, although this seepage of the expanded polymeric material creates an unpleasing and unaesthetic appearance, it facilitates installation and facilitates inspection. Since the register box 10 is typically maintained in an unobservable location, the unpleasing appearance of this seepage is of little or no aesthetic importance.

Figure 2:
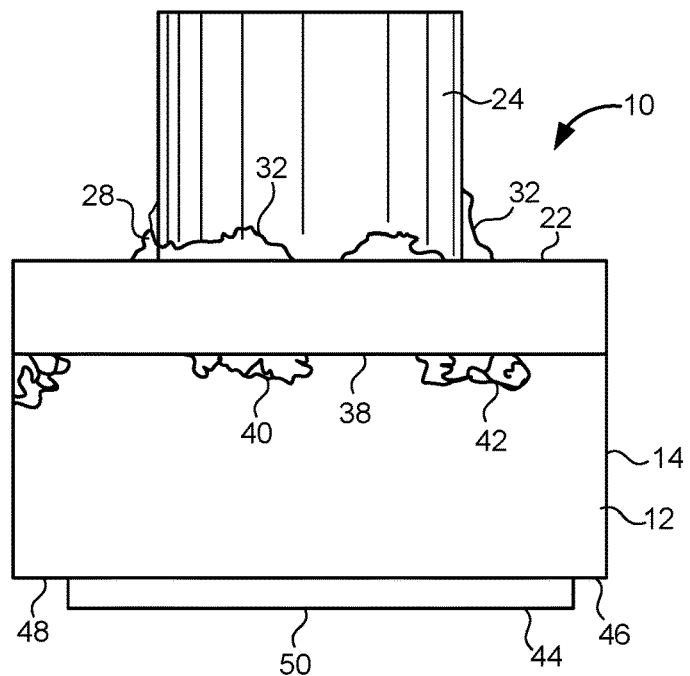
FIG. 2 is a side elevational view of the register box formed in accordance with the process of the present invention.

FIG. 2 shows a side view of the register box 10. As can be seen in FIG. 2, the side panel 14 is particularly illustrated. Side panel 14 includes another seam 38. Portions 40 and 42 of the expanded polymeric material are illustrated as emerging out of the seam 38. Additionally, the duct 24 is illustrated as affixed to and extending outwardly of the wall 22. The portions 32 of the expanded polymeric material are illustrated as extending between through the seam 28 between the duct 24 and the wall 22 and residing on the exterior of the duct 24. In FIG. 2, it can be seen that there is a lip 44 that extends outwardly of the end 46 of the body 12. The lip 44, as will be described hereinafter, extends outwardly of a flange 48. Flange 48 extends inwardly from the side panels 14, 16, 18 and 20 such that the inner edges define an aperture 50 opening to the interior of the body 12.

Figure 3:
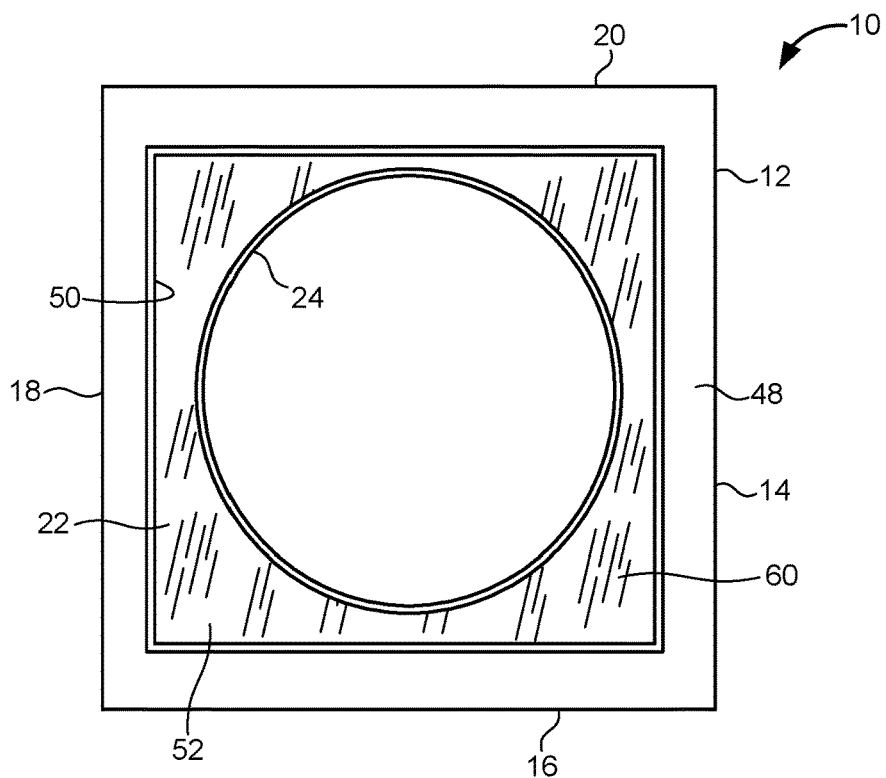
FIG. 3 is a end view of the register box formed in accordance with the process of the present invention.

FIG. 3 is an end view of the register box 10 of the present invention. In FIG. 3, it can be seen that the duct 24 is affixed to the wall 22. Wall 22 includes a surface 52 that extends from the opening of the duct 24 to the side panels 14, 16, 18 and 20 of the body 12. In FIG. 3, it can be seen that the expanded polymeric material 60 resides over the surface 52 and extends to the side panels 14, 16, 18 and 20. As such, the expanded polymeric material 90 effectively insulates the wall 22 in the area adjacent to the opening of the duct 24.

FIG. 3 further shows the nature of the flanges 48. Flange 48 is illustrated as extending around the interior of the body 12. Flange 48 has a particular width. In accordance with the present invention, and as will be described in association with FIG. 4, the expanded polymeric material 60 will reside against the side panels 14, 16, 18 and 20 and have a thickness approximately equal to the width of the flanges 48. The lip 50 is illustrated as extending in transverse relationship from the flange 48.

Figure 4:
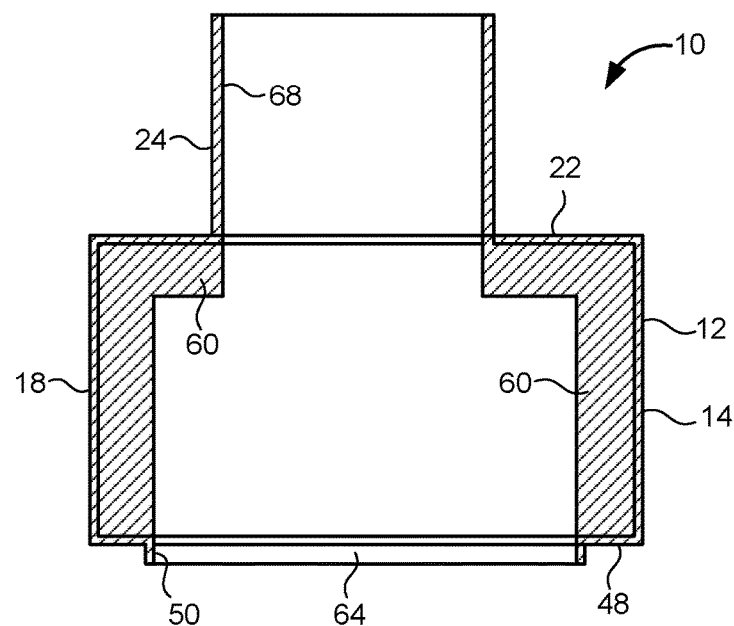
FIG. 4 is a cross-sectional view of the register box as formed by the process of the present invention.

FIG. 4 is a cross-sectional view of the register box 10 of the present invention. As can be seen in FIG. 4, the expanded polymeric material 60 is illustrated as positioned against the side panels 14 and 18. A similar configuration, such as shown in FIG. 4, will occur with respect to the side panels 16 and 20. The expanded polymeric material 60 is illustrated as having a thickness approximately equal to the width dimension of the flange 48. The flange 48, along with the lip 50 defines an aperture 64 that opens to the interior of the body 12. The expanded polymeric material 60 also has a portion 60 that resides against the inner surface of the wall 22. This portion 60 extends from the side panels 14 and 18 so as to generally be aligned with the opening of the duct 24.

In this configuration, the expanded polymeric material 60 can serve as an insulation. This installation is compliant with national building codes, is fire resistant, and also avoids the use of fibrous insulation material. As such, this type of material, since it avoids the fibrous material in the assembly requirements, improves the health and safety of workers that assemble the register box 10. The insulation created by the expanded polymeric material 60 does not require any alterations in the structure of the body 12 or of the duct 24. The insulation material causes the register box 10 to be very energy efficient. Also, since the expanded polymeric material 60 enters and emerges through the various openings, gaps, seams, and holes in the register box 10, it minimizes air loss and improves inspectability.

In FIG. 4, it can be seen that there is no expanded polymeric material located on the inner wall 68 of the duct 24. If any expanded polymeric material would enter the duct 24 or reside on the inner wall 68 of the duct 24, then it could hamper air circulation. As such, it was felt that it was important to block any movement of the expanded polymeric material from entering the area on the interior of the duct 24. Since the expanded polymeric material 60 extends to the aperture 64 that is defined by the lips 50 and the flanges 48, it does not interfere with airflow into the interior of the register box. As such, the present invention remains substantially aerodynamic while, at the same time, improving the insulating qualities required of the register box 10.

Figure 5:
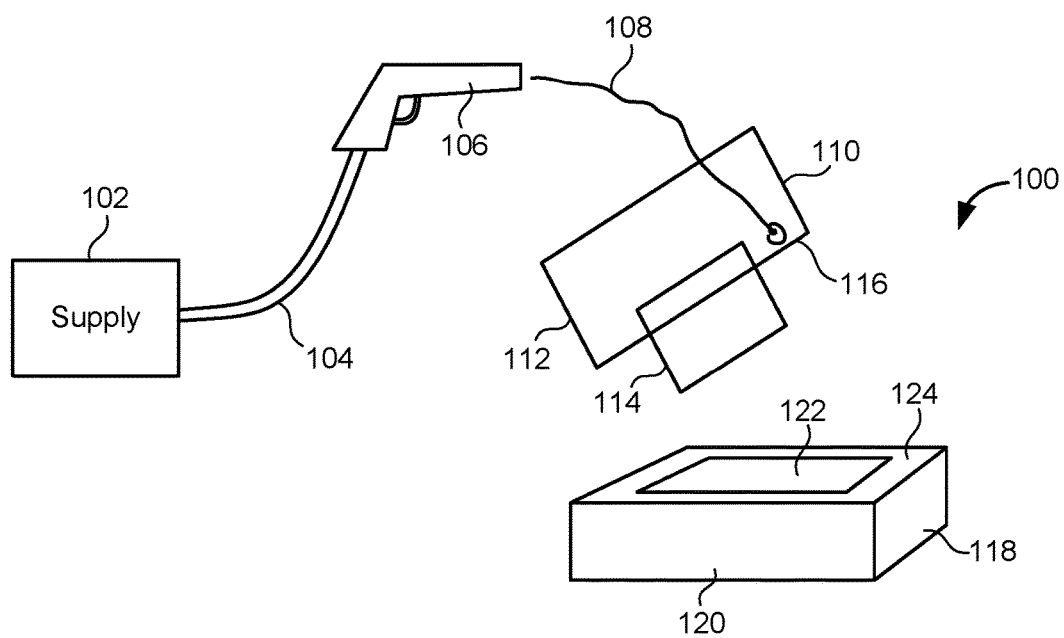
FIG. 5 shows an initial step in the process of forming the insulated register box of the present invention.

FIG. 5 illustrates an early step in the process of forming the register box of the type shown in FIGS. 1-4. In FIG. 5, it can be seen that there is a supply 102 of the expandable polymeric material. The expandable polymeric material, in the preferred embodiment of the present invention, is polyurethane. A conduit 104 extends from the supply 102 to a foam gun 106. As such, the foam gun 106 will inject foamed expandable polymeric material 108 toward the interior of the register box 110. The register box 110 includes a plurality of side panels 112 arranged in a generally rectangular configuration of the type described hereinbefore. There is a duct 114 that opens through a wall 116 that extends across the generally rectangular configuration of the plurality of panels 112. It can be seen that the foamed expandable polymeric material is flowed generally toward the wall 116 and also around the plurality of side panels 112. The register box 110 is maintained and moved at an angle so as to allow the person operating the foam gun 106 to direct the foam expandable polymeric material 108 generally around the interior of each of the plurality of side panels 112 and also to portions of the wall 116 away from the opening of the duct 114.

A support structure 118 is illustrated as located below the register box 110. In the preferred embodiment of the present invention, the support structure 118 is a frame that has sides 120 and an interior 122. After the foamed expandable polymeric material is directed generally around the side panels 112 and the wall 116, the duct 114 will be introduced into the interior 122 of support structure 118. The portions of the wall 116 that extend outwardly of the duct 114 will reside on the top surface 124 of the support structure 118.

Figure 6:
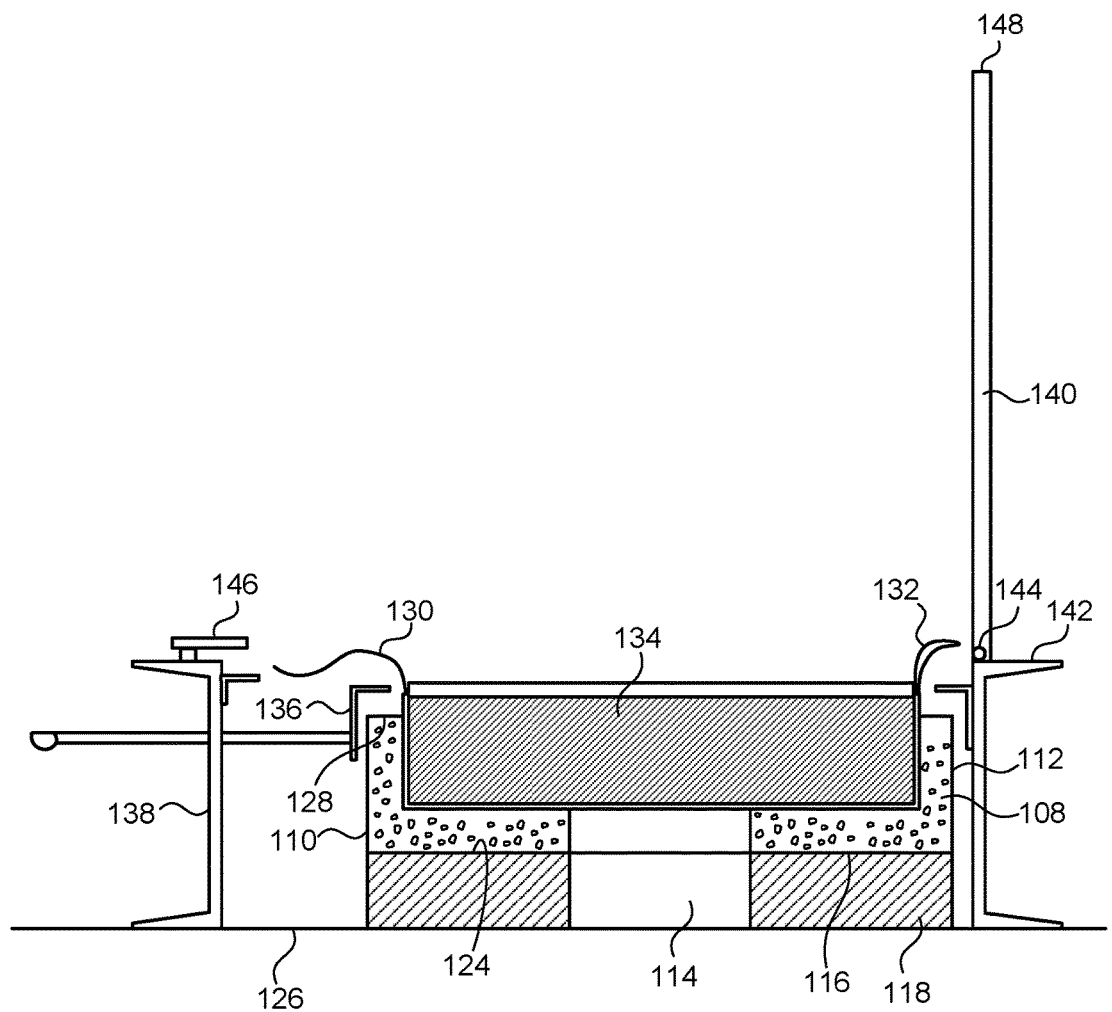
FIG. 6 shows a further step in the process of forming the insulated register box of the present invention.

In FIG. 6, it can be seen that the support structure 118 is placed upon an underlying surface 126. As will be described hereinafter, in the preferred embodiment the present invention, the support structure 126 can be a carousel. The duct 114 is illustrated as positioned within the interior 122 of the support structure 118. The wall 116 will reside on the top 124 of the support structure 118. In FIG. 6, the foamed expandable polymeric material 108 is illustrated as residing against the plurality of side panels 112 and also against the wall 116.

In FIG. 6, it can be seen that the register box 110 has flanges 128 that extend inwardly from the plurality of side panels 112. Flanges 128 will extend inwardly from an end of the side panels 112 opposite the wall 116. The flanges 128 will define an aperture of the register box.

With reference to FIG. 6, after the foamed expandable polymeric material 108 has been introduced into the interior of the register box 110, a liner 130 is placed over the expandable polymeric material. The liner 130 will include edges 132 which extend outwardly of the register box 110. As such, these edges 132 can provide a grasping surface. A form 134 is then placed upon the liner 130 and into the interior of the register box 110. The form 134 is a metal plug which has a diameter greater than a diameter of the duct 114. As such, the bottom of the mold 134 will extend beyond the diameter of the duct 114. The form 134 is intended to shape the insulation of the register box 110. As such, it will have a shape that corresponds to the intended shape of the insulation on the interior of the register box 110. As described herein, the liner 130 can be a plastic sheet or it can be a surface that is formed on the form 134. The purpose of the liner 130 is to allow the separation of the form 134 from the solidified expanded polymeric material 108.

A adjustable hold-down 136 is maintained by a support 138. Adjustable hold-down 136 serves to secure the register box 110 on the support structure 118 and also to maintain the register box 110 and the support structure 118 upon the underlying surface 126. A lid 140 is illustrated as extending upwardly from a member 142. The lid 140 is connected to the member 142 by a hinge 144. Member 142 extends upwardly from the underlying surface 126 in proximity to one of the panels 12 of the register box 110. A latch 146 is located adjacent to an opposite side of the register box 110. Latch 146, as will be described hereinafter, serves to receive the end 148 of the lid 140 so as to lock the lid 148 in positioned over the form 134 and over the top of the register box 110.

Figure 7:
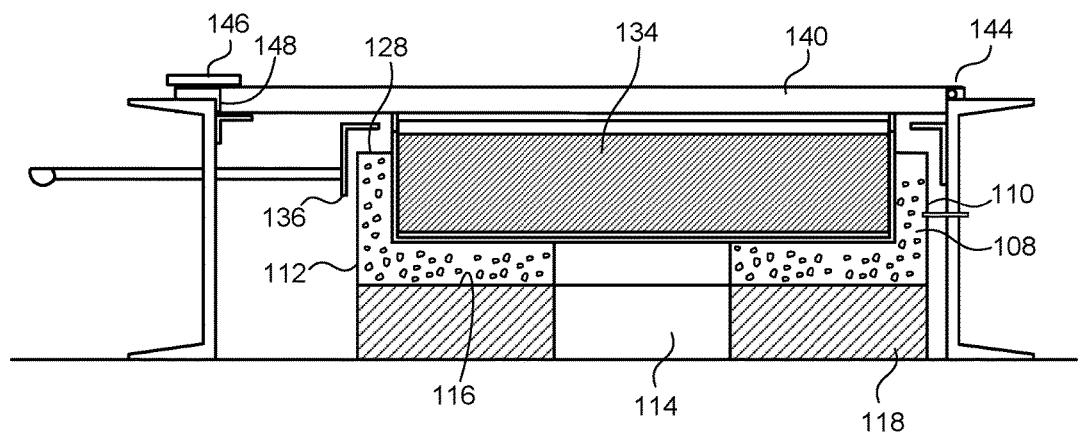
FIG. 7 shows a further step in the forming of the insulated register box of the present invention.

FIG. 7 shows a further step in the process of the present invention. In FIG. 7, it can be seen that the lid 140 is pivoted downwardly about the hinge 144 so as to be juxtaposed against the top of the form 134. The end 148 is locked in position by the latch 146. Importantly, in this configuration, the lid 140 provides resistance against the expansion of the expandable polymeric material 108 within the register box 110. As such, the expandable polymeric material 108 can properly solidify in a desired configuration within the interior of the register box 110. This is important since polyurethane has generally irregular expansion characteristics. As such, the lid 140 will confine this expansion of the expandable polymeric material 108 to the shape that is desired so as to form the installation of the register box 110.

After the expandable polymeric material 108 has solidified, the lid 140 can be pivoted upwardly and unlatched from latch 146. With reference to FIG. 6, the outwardly extending edges 132 can be grasped and lifted upwardly so as to remove the form 134 from the interior of the register box 110. The solidified polymeric material 108 will have the desired shape and configuration shown in FIGS. 1-4. Ultimately, the adjustable hold-down 136 can be moved away from the register box 110 so as to allow the register box 110 to be lifted upwardly and removed from the support structure 118. As such, a properly formed register box is achieved. As was described hereinafter, the solidified expandable polymeric material 108 will have a thickness at the side panels 112 generally equal to the width of the flange 128. Similarly, the expandable polymeric material 108 will have a suitable thickness extending upwardly from the wall 116. The expandable polymeric material 108 will leave the duct 114 exposed.

The expanded polymeric material 108 can include portions that emerge through small cracks or gaps in the seams associated with the register box 110, as described hereinbefore. In particular, the solidified expanded polymeric material 108 can flow outwardly through the small seam that exists between the duct 114 and the wall 116 of the register box 110. It can also emerge through the small seams formed the between the side panels 112 and the wall 116.

The process of the present invention greatly improves the efficiency of the production of insulated register boxes. In the past, a great deal of manual activity was required so as to install the fibrous insulating material against the various side panels and wall of the register box. In the present invention, since fibrous insulating material is not required, the present invention can rapidly create insulated register boxes.

Figure 8:
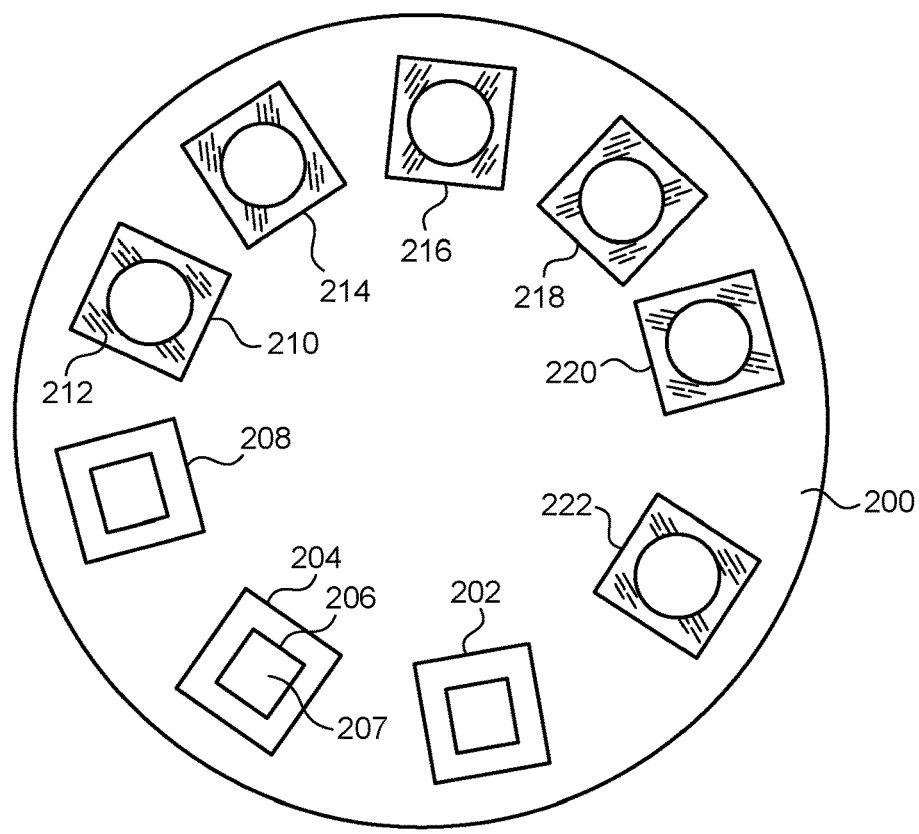
FIG. 8 is a plan view showing a carousel as used in the process of forming the register box of the present invention.

FIG. 8 shows a carousel 200 that is provided with a plurality of the support structures 202, 204, 208, 210, 214, 216, 218, 220, and 222. Support structures 202, 204 and 208 are illustrated in a position prior to receiving the register box therein. As such, the register the support structure 204 will have an interior 207 which serves to receive the duct 114 of the register box.

The support structure 210 has the register box 212 therein. This register box 212 is formed in accordance with the teachings of the present invention hereinbefore. As one register box 212 is initially formed, it can be rotated on the carousel 200 so as to move to another position. As such, another insulated register box can be placed onto the support structure 208 and the process carried out thereafter. That carousel 200 will continue to rotate until the insulated register box 224 reaches and end of the rotation of the carousel 200. As such, a worker can lift the register box 224 from the support structure 222 for the purposes of storing the complete register box. Thereafter, another register box can be introduced onto the support structure 222 and the process continues onward. Unlike previous insulated register boxes, the process of the present invention greatly facilitates the ability to stack. Since the expanded polymeric material will solidify in approximately two minutes, the process associated with carousel 200 is relatively rapid.

Figure 9:
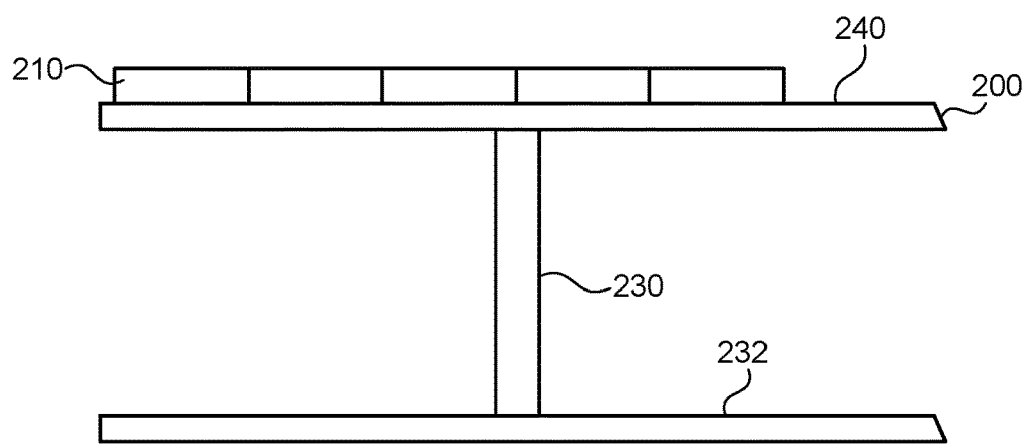
FIG. 9 is a side elevational view of the carousel and support structure as used in the formation of the insulated register box of the present invention.

FIG. 9 is a side view showing the arrangement of the carousel 200 and the various register boxes and support structures 210 thereon. In particular, in FIG. 9, it can be seen that the carousel 200 is rotatably mounted on a support 230. The support 230 is maintained in an upright position by a base 232. Each of the support structures 210 (including the register boxes thereon) are arranged on the top surface 240 of the carousel 200.

The foregoing disclosure and description of the invention is illustrative and explanatory thereof. Various changes in the details of the illustrated construction can be made within the scope of the present claims without departing from the true spirit of the invention. The present invention should only be limited by the following claims and their legal equivalents.

I claim:

1. A process for insulating a register box, the register box having a plurality of side panels arranged in a generally rectangular configuration and a duct opening through a wall that extends across the generally rectangular configuration, the process comprising:
    flowing an expandable polymeric material toward the plurality of side panels;
    placing the register box into or onto a support structure;
    introducing a liner over the flowed expandable polymeric material within the register box;
    placing a form onto the liner into the in the register box so as to shape the expandable polymeric material within the register box; and
    removing the form and the liner from the register box.

2. The process of claim 1, further comprising:
    closing a lid over said form and over an end of the register box so as to limit an expansion of the expandable polymeric material.

3. The process of claim 2, further comprising:
    locking said lid over the end of the register box for a period of time while the expandable polymeric material expands.

4. The process of claim 3, further comprising:
    unlocking said lid prior to the step of removing the form and the liner.

5. The process of claim 1, further comprising:
    positioning said support structure onto an underlying surface prior to the step of placing the register box.

6. The process of claim 1, said support structure having an interior, the step of placing the register box comprising:
    positioning the duct into the interior of said support structure and positioning the wall of the register box onto a top of said support structure.

7. The process of claim 1, further comprising:
    locking said support structure so as to be in a fixed position on the underlying surface.

8. The process of claim 1, said form being a plug having a diameter greater than a diameter of the duct, the step of placing the form comprising:
    placing said plug over the duct so as to be generally axially aligned with the duct such that said plug resides on the wall of the register box.

9. The process of claim 1, the step of introducing said liner comprising:
    introducing said liner over the flowed expandable polymeric material such that outer edges of said liner reside outwardly of an end of the register box.

10. The process of claim 9, the step of removing comprising:
grasping the outer edges of the liner; and
lifting said liner and said form from the register box.

11. The process of claim 10, further comprising:
lifting the register box from said support structure following the step of removing.

12. The process of claim 5, said underlying surface being a carousel, the process further comprising:
rotating said carousel prior to the step of removing.

13. The process of claim 1, further comprising:
solidifying the flowed expandable polymeric material against the plurality of side panels.

14. The process of claim 13, the register box having a plurality of flanges extending inwardly respectively from the plurality of side panels at an end thereof opposite the wall of the register box, the plurality of flanges defining an aperture, the step of solidifying comprising:
solidifying the expandable polymeric material against the plurality of side panels such that the solidified expandable polymeric material as a thickness approximately equal to a width of the flange.

15. The process of claim 13, at least one side panel of said plurality of side panels having a seam, the step of solidifying comprising:
solidifying the expandable polymeric material such that a portion of the solidified expandable material emerges through the seam.

16. The process of claim 13, the wall having a seam adjacent the opening of the duct, the step of solidifying comprising:
solidifying expandable polymeric material such that a portion of the solidified expandable polymeric material emerges through the seam.

17. The process of claim 13, the step of removing being after the step of solidifying.

18. The process of claim 1, the step of flowing comprising:
providing a supply of the expandable polymeric material; and
injecting the supply of the expandable polymeric material as a foam toward the plurality of side panels.

19. The process of claim 18, the step of injecting comprising:
moving a foam gun around the interior of the register box such that the foam expandable polymeric material is directed toward the plurality of side panels.

* * * * *